United States Patent
Choi et al.

(10) Patent No.: US 12,245,115 B2
(45) Date of Patent: Mar. 4, 2025

(54) METHOD TO EXTEND OPERATIONAL DOMAIN USING PRE-DOWNLOADS OF TILES FOR NON- OR LOW CELLULAR SIGNAL AREA

(71) Applicant: GM GLOBAL TECHNOLOGY OPERATIONS LLC, Detroit, MI (US)

(72) Inventors: Gabriel Tayoung Choi, Novi, MI (US); Anthony W Cullen, Howell, MI (US); Morgan Douglas Dykshorn, Oak Park, MI (US); Nolan Foster, Berkley, MI (US); Matthew Robert Wallace, Royal Oak, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 405 days.

(21) Appl. No.: 17/805,982

(22) Filed: Jun. 8, 2022

(65) Prior Publication Data
US 2023/0403542 A1    Dec. 14, 2023

(51) Int. Cl.
*H04W 4/46* (2018.01)
*G01C 21/00* (2006.01)
*H04W 4/24* (2024.01)

(52) U.S. Cl.
CPC .......... *H04W 4/46* (2018.02); *G01C 21/3885* (2020.08); *H04W 4/24* (2013.01)

(58) Field of Classification Search
CPC ....... H04W 4/46; H04W 4/24; G01C 21/3885
See application file for complete search history.

(56) References Cited

U.S. PATENT DOCUMENTS

| | | | | |
|---|---|---|---|---|
| 2006/0135180 A1* | 6/2006 | Jakel | ...................... | H04W 48/16 455/456.1 |
| 2019/0277651 A1* | 9/2019 | Ruikar | ............... | G01C 21/3889 |
| 2020/0256685 A1* | 8/2020 | Kamphenkel | ......... | H04W 4/027 |
| 2020/0351201 A1* | 11/2020 | Li | ........................ | G06F 11/3006 |
| 2021/0183099 A1* | 6/2021 | Fujii | ....................... | G06T 7/248 |
| 2021/0199463 A1* | 7/2021 | Kitahara | ............. | G01C 21/3815 |
| 2022/0222060 A1* | 7/2022 | Chikamori | ......... | G01C 21/3881 |
| 2022/0345859 A1* | 10/2022 | Falla Cepeda | .......... | H04W 4/40 |
| 2023/0003548 A1* | 1/2023 | Schwartz | ............. | G01C 21/367 |

\* cited by examiner

*Primary Examiner* — Justin Y Lee
(74) *Attorney, Agent, or Firm* — Lorenz & Kopf LLP (57) ABSTRACT

In exemplary embodiments, methods and systems are provided for downloading of geographic information. In accordance with an exemplary embodiment, a method is provided that includes the following steps: identifying, via a processor using map data, a plurality of geographic areas in which a vehicle is to travel along a selected route to a destination; identifying, via the processor using the map data, a plurality of map tiles corresponding to the plurality of geographic areas, such that each of the plurality of map tiles corresponds to a different one of the plurality of geographic areas; obtaining data access information for each of the plurality of geographic areas; and determining, via the processor, a prioritized sequence for downloading the plurality of map tiles, based on the data access information for the plurality of geographic areas.

20 Claims, 8 Drawing Sheets

METHOD TO EXTEND OPERATIONAL DOMAIN USING PRE-DOWNLOADS OF TILES FOR NON- OR LOW CELLULAR SIGNAL AREA

TECHNICAL FIELD

The technical field generally relates to vehicles, and more particularly relates to methods and systems for downloading geographic information, for example for upcoming area in which cellular signals may be low or nonexistent.

Certain vehicles today have sensors and systems to download geographic information, such as for use in controlling one or more vehicle systems. However, such existing systems may not always be optimal, including for geographic areas in which cellular reception may be low or nonexistent.

Accordingly, it may be desirable to provide improved methods and systems for downloading geographic information, such as for geographic areas in which cellular reception may be low or nonexistent. Furthermore, other desirable features and characteristics of the present invention will become apparent from the subsequent detailed description of the invention and the appended claims, taken in conjunction with the accompanying drawings and this background of the invention.

SUMMARY

In accordance with an exemplary embodiment, a method is provided that includes the following steps: identifying, via a processor using map data, a plurality of geographic areas in which a vehicle is to travel along a selected route to a destination; identifying, via the processor using the map data, a plurality of map tiles corresponding to the plurality of geographic areas, such that each of the plurality of map tiles corresponds to a different one of the plurality of geographic areas; obtaining data access information for each of the plurality of geographic areas; and determining, via the processor, a prioritized sequence for downloading the plurality of map tiles, based on the data access information for the plurality of geographic areas.

Also in an exemplary embodiment, the method further includes downloading, to the vehicle, via instructions provided by the processor, the plurality of map tiles in accordance with the prioritized sequence.

Also in an exemplary embodiment, the method further includes controlling a vehicle action, in accordance with further instructions provided by the processor, using geographic information from the plurality of map tiles.

Also in an exemplary embodiment: the obtaining of the data access information includes obtaining cellular reception information for each of the plurality of geographic areas; and the determining of the prioritized sequence includes determining, via the processor, the prioritized sequence for downloading the plurality of map tiles, based on the cellular reception information for the plurality of geographic areas.

Also in an exemplary embodiment, the method further includes determining, via the processor, groups of consecutive map tiles with corresponding geographic areas with reduced or no cellular reception; wherein the step of determining the prioritized sequence includes determining, via the processor, the prioritized sequence for downloading the plurality of map tiles, based on the groups of consecutive map tiles with corresponding geographic areas with reduced or no cellular reception.

Also in an exemplary embodiment, the step of determining the prioritized sequence further includes determining the prioritized sequence such that a particular map tile is downloaded prior to any groups of consecutive map tiles with corresponding geographic areas with reduced or no cellular reception that immediately precede the particular map tile.

Also in an exemplary embodiment, the method further includes determining that specific geographic areas have reduced or no cellular reception based on signal continuity data obtained from one or more other vehicles.

Also in an exemplary embodiment, the method further includes: determining additional signal continuity data from the vehicle; and updating the cellular reception information, using the additional signal continuity data from the vehicle, for use by the one or more other vehicles.

In another exemplary embodiment, a system is provided that includes: a computer memory configured to store map data; and a processor coupled to the computer memory and configured to at least facilitate: identifying, using the map data, a plurality of geographic areas in which a vehicle is to travel along a selected route to a destination; identifying, using the map data, a plurality of map tiles corresponding to the plurality of geographic areas, such that each of the plurality of map tiles corresponds to a different one of the plurality of geographic areas; obtaining data access information for each of the plurality of geographic areas; and determining a prioritized sequence for downloading the plurality of map tiles, based on the data access information for the plurality of geographic areas.

Also in an exemplary embodiment, the processor is further configured to at least facilitate downloading, to the vehicle, via instructions provided by the processor, the plurality of map tiles in accordance with the prioritized sequence.

Also in an exemplary embodiment, the processor is further configured to at least facilitate controlling a vehicle action, in accordance with further instructions provided by the processor, using geographic information from the plurality of map tiles.

Also in an exemplary embodiment, the processor is further configured to at least facilitate: obtaining cellular reception information for each of the plurality of geographic areas; and determining the prioritized sequence for downloading the plurality of map tiles, based on the cellular reception information for the plurality of geographic areas.

Also in an exemplary embodiment, the processor is further configured to at least facilitate: determining groups of consecutive map tiles with corresponding geographic areas with reduced or no cellular reception; and determining the prioritized sequence for downloading the plurality of map tiles, based on the groups of consecutive map tiles with corresponding geographic areas with reduced or no cellular reception.

Also in an exemplary embodiment, the processor is further configured to at least facilitate determining the prioritized sequence such that a particular map tile is downloaded prior to any groups of consecutive map tiles with corresponding geographic areas with reduced or no cellular reception that immediately precede the particular map tile.

Also in an exemplary embodiment, the processor is further configured to at least facilitate determining that specific geographic areas have reduced or no cellular reception based on signal continuity data obtained from one or more other vehicles.

Also in an exemplary embodiment, the processor is further configured to at least facilitate: determining additional signal continuity data from the vehicle; and updating the cellular reception information, using the additional signal continuity data from the vehicle, for use by the one or more other vehicles.

In another exemplary embodiment, a vehicle is provided that includes: a body; a computer memory configured to store map data; and a processor coupled to the computer memory and configured to at least facilitate: identifying, using the map data, a plurality of geographic areas in which the vehicle is to travel along a selected route to a destination; identifying, using the map data, a plurality of map tiles corresponding to the plurality of geographic areas, such that each of the plurality of map tiles corresponds to a different one of the plurality of geographic areas; obtaining data access information for each of the plurality of geographic areas; and determining a prioritized sequence for downloading the plurality of map tiles, based on the data access information for the plurality of geographic areas.

Also in an exemplary embodiment, the processor is further configured to at least facilitate: downloading, to the vehicle, via instructions provided by the processor, the plurality of map tiles in accordance with the prioritized sequence; and controlling a vehicle action, in accordance with further instructions provided by the processor, using geographic information from the plurality of map tiles.

Also in an exemplary embodiment, the processor is further configured to at least facilitate: obtaining cellular reception information for each of the plurality of geographic areas; and determining the prioritized sequence for downloading the plurality of map tiles, based on the cellular reception information for the plurality of geographic areas.

Also in an exemplary embodiment, the processor is further configured to at least facilitate: determining groups of consecutive map tiles with corresponding geographic areas with reduced or no cellular reception; and determining the prioritized sequence for downloading the plurality of map tiles, based on the groups of consecutive map tiles with corresponding geographic areas with reduced or no cellular reception.

DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

Figure 1:
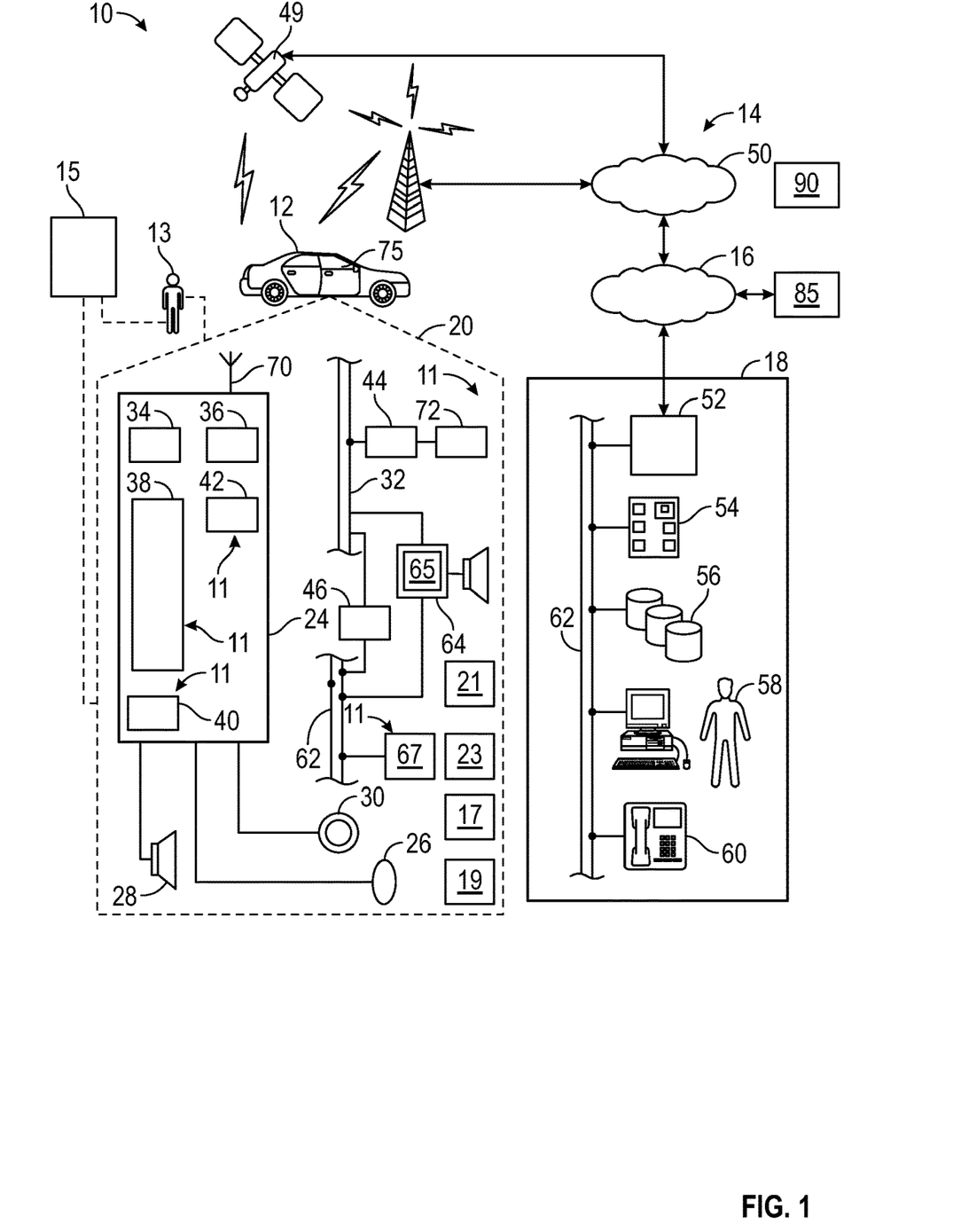
FIG. 1 is a functional block diagram of a communications system that includes a vehicle having a control system that is configured to download map information for upcoming geographic areas, including areas with little or no cellular reception, in accordance with an exemplary embodiment.

FIG. 1 is a functional block diagram of a communications system 10, in accordance with an exemplary embodiment. As described in greater detail further below, the communications system 10 includes a vehicle 12 (also referred to herein as the "host vehicle") that includes a control system 11 that is configured to download map information, including for geographic areas having little or no cellular reception (e.g., as depicted in FIGS. 2-8 and described in greater detail further below in connection therewith), in accordance with an exemplary embodiment.

As described further below, in various embodiments, the control system 11 includes a mapping system 21, a processor 38, a computer memory 40, vehicle sensors 72, and one or more displays 67. In certain embodiments, the control system may also include a satellite-based location determining system component (e.g., GPS) 42, among various other components.

In certain embodiments, the vehicle 12 comprises a semi-autonomous vehicle 12 with automated control over certain vehicle functionality via the control system 11, for example including automated control of a vehicle powertrain 17, braking system 23, and/or steering system 19, among other possible vehicle systems.

As depicted in FIG. 1, in certain embodiments, a user (e.g., a driver) 13 also has a device 15, such as a smart phone, computer, and/or other electronic device 15, for example that may communicate with both the user (e.g., the driver) 13 and the vehicle 12.

As depicted in FIG. 1, the communications system 10 generally includes the vehicle 12, along with one or more wireless carrier systems 14, one or more land networks 16, and one or more remote servers 18. In various embodiments, the communications system 10 may also include one or more information providers 85 and other vehicles 90. It should be appreciated that the overall architecture, setup, and operation, as well as the individual components of the illustrated system are merely exemplary and that differently configured communications systems may also be utilized to implement the examples of the method disclosed herein. Thus, the following paragraphs, which provide a brief overview of the illustrated communications system 10, are not intended to be limiting.

The vehicle 12 may be any type of mobile vehicle such as a motorcycle, car, truck, recreational vehicle (RV), boat, plane, farm equipment, or the like, and is equipped with suitable hardware and software that enables it to communicate over communications system 10. As shown in FIG. 1, in various embodiments the vehicle hardware 20 is disposed within a body 75 of the vehicle 12, and includes a telematics unit 24, a microphone 26, a speaker 28, and buttons and/or controls 30 connected to the telematics unit 24. Operatively coupled to the telematics unit 24 is a network connection or vehicle bus 32. Examples of suitable network connections include a controller area network (CAN), a media-oriented system transfer (MOST), a local interconnection network (LIN), an Ethernet, and other appropriate connections such as those that conform with known ISO (International Organization for Standardization), SAE (Society of Automotive Engineers), and/or IEEE (Institute of Electrical and Electronics Engineers) standards and specifications, to name a few.

The telematics unit 24 is an onboard device that provides a variety of services through its communication with the remote server 18, and generally includes an electronic processing device (processor) 38, one or more types of electronic memory 40, a cellular chipset/component 34, a wireless modem 36, a dual mode antenna 70, and a navigation unit containing a GPS chipset/component 42. In one example, the wireless modem 36 includes a computer program and/or set of software routines adapted to be executed within electronic processing device 38.

In various embodiments, the telematics unit 24 can be an embedded/installed within the vehicle 12 at the time of manufacture, or may be an aftermarket unit that is installed after manufacture of the vehicle 12. In various embodiments, the telematics unit 24 enables voice and/or data communications over one or more wireless networks (e.g., wireless carrier system 14), and/or via wireless networking, thereby allowing communications with the remote server 18 and/or other vehicles and/or systems.

In various embodiments, the telematics unit 24 may use radio transmissions to establish a voice and/or data channel with the wireless carrier system 14 so that both voice and data transmissions can be sent and received over the voice and/or data channels. Vehicle communications are enabled via the cellular chipset/component 34 for voice communications and the wireless modem 36 for data transmission. Any suitable encoding or modulation technique may be used with the present examples, including digital transmission technologies, such as TDMA (time division multiple access), CDMA (code division multiple access), W-CDMA (wideband CDMA), FDMA (frequency division multiple access), OFDMA (orthogonal frequency division multiple access), and the like. In one embodiment, dual mode antenna 70 services the GPS chipset/component 42 and the cellular chipset/component 34. In various embodiments, the telematics unit 24 utilizes cellular communication according to industry standards, such as LTE, 5G, or the like. In addition, in various embodiments, the telematics unit 24 carries out wireless networking between the vehicle 12 and one or more other network devices, for example using one or more wireless protocols such as one or more IEEE 802.11 protocols, WiMAX, or Bluetooth.

The telematics unit 24 may offer a number of different services for users of the vehicle 12, including downloading of map information, including for geographic areas having little or no cellular reception (e.g., as depicted in FIGS. 2-8 and described in greater detail further below in connection therewith) and use of such downloaded map information in automatically controlling one or more vehicle functions (such as the powertrain 17, braking system 23, steering system 19, and/or other vehicle systems), in accordance with an exemplary embodiment In addition, in certain embodiments, the telematics unit 24 may also provide connection with electronic devices 15. In various embodiments, the electronic devices may include, by way of example, various consumer electronic/mobile devices, such as a smart phone, a laptop, a smart wearable device, a tablet computer, a network computer, and/or one or more other electronic devices and/or combinations thereof.

In various embodiments, one or more short-range wireless connection (SRWC) protocols (e.g., Bluetooth/Bluetooth Low Energy, or Wi-Fi) may be utilized. In various embodiments, once the SRWC is established, the electronic devices 15 may be become bonded and/or recognized as network participants for the telematics unit 24, for example for current uses as well as in the future. For example, in certain embodiments, when the electronic device is subsequently in wireless range with the telematics unit 24 after the initial pairing, telematics unit 24 (and/or the remote server 18) may confirm that the electronic device 15 is recognized as already being paired or established as a network participant for communicating with the telematics unit 24 and receiving services therefrom.

In addition, in various embodiments, the telematics unit 24 may also provide other services, such as, by way of example: turn-by-turn directions and other navigation-related services provided in conjunction with the GPS chipset/component 42; emergency assistance services, information requests from the users of the vehicle 12 (e.g., regarding points of interest en route while the vehicle 12 is travelling), and/or infotainment-related services, for example in which music, internet web pages, movies, television programs, videogames, and/or other content are downloaded by an infotainment center 46 that may be part of the telematics unit 24 and/or operatively connected to the telematics unit 24 via vehicle bus 32 and audio bus 22, among various other types of possible services.

With respect to other electronic components utilized in connection with the telematics unit 24, the microphone 26 provides the driver or other vehicle occupant with a means for inputting verbal or other auditory commands, and can be equipped with an embedded voice processing unit utilizing a human/machine interface (HMI) technology known in the art. Conversely, speaker 28 provides audible output to the vehicle occupants and can be either a stand-alone speaker specifically dedicated for use with the telematics unit 24 or can be part of a vehicle audio component 64. In either event, microphone 26 and speaker 28 enable vehicle hardware 20 and remote server 18 to communicate with the occupants through audible speech. The vehicle hardware also includes one or more buttons and/or controls 30 for enabling a vehicle occupant to activate or engage one or more of the vehicle hardware components 20. For example, one of the buttons and/or controls 30 can be an electronic pushbutton used to initiate voice communication with remote server 18 (whether it be a human such as advisor 58 or an automated call response system). In another example, one of the buttons and/or controls can be used to initiate emergency services.

The audio component 64 is operatively connected to the vehicle bus 32 and the audio bus 22. The audio component 64 receives analog information, rendering it as sound, via the audio bus 22. Digital information is received via the vehicle bus 32. The audio component 64 provides amplitude modulated (AM) and frequency modulated (FM) radio, compact disc (CD), digital video disc (DVD), and multimedia functionality independent of the infotainment center 46. Audio component 64 may contain a speaker system, or may utilize speaker 28 via arbitration on vehicle bus 32 and/or audio bus 22. In various embodiments, the audio component 64 includes radio system 65 (which also includes antenna 70, as well as amplifiers, speakers, and the like, in certain embodiments).

Also in various embodiments, display component 67 provides a visual display for the driver 13 of the vehicle 12. In various embodiments, the display components 67 provides a visual display for the driver 13, for example as to the downloaded map information and/or pertaining to the automatic control of the vehicle functions via the control system 11, for example as described in greater detail further below in connection with FIGS. 2-8.

Vehicle sensors 72, connected to various sensor interface modules 44 are operatively connected to the vehicle bus 32. In various embodiments, the vehicle sensors 72 may also include any number of different types of sensors including, by way of example, wheel speed sensors, gyroscopes, accelerometers, magnetometers, emission detection, and/or control sensors, and the like. Also in various embodiments, exemplary sensor interface modules 44 include powertrain control, braking control, steering control, climate control, and body control, to name but a few.

In various embodiments, the wireless carrier systems 14 may be any number of cellular telephone systems, satellite-based wireless systems, and/or any other suitable wireless systems, for example that transmits signals between the vehicle hardware 20 and land network 16 (and/or, in certain embodiments, that communicate directly with the vehicle 12 and/or the remote server 18). According to certain examples, wireless carrier system 14 may include and/or be coupled to one or more cell towers 48, satellites 49, base stations and/or mobile switching centers (MSCs) 50, as well as any other networking components required to connect the wireless carrier system 14 with land network 16. As appreciated by those skilled in the art, various cell tower/base station/MSC arrangements are possible and could be used with wireless carrier system 14.

The land network 16 can be a conventional land-based telecommunications network that is connected to one or more landline telephones, and that connects wireless carrier system 14 to remote server 18. For example, the land network 16 can include a public switched telephone network (PSTN) and/or an Internet protocol (IP) network, as is appreciated by those skilled in the art. Of course, one or more segments of the land network 16 can be implemented in the form of a standard wired network, a fiber or other optical network, a cable network, other wireless networks such as wireless local networks (WLANs) or networks providing broadband wireless access (BWA), or any combination thereof.

The remote server 18 is designed to provide the vehicle hardware 20 with a number of different system back-end functions and, according to the example shown here, generally includes one or more switches 52, servers 54, databases 56, advisors 58, as well as a variety of other telecommunication/computer equipment 60. These various call center components are suitably coupled to one another via a network connection or bus 62, such as the one previously described in connection with the vehicle hardware 20. Switch 52, which can be a private branch exchange (PBX) switch, routes incoming signals so that voice transmissions are usually sent to either advisor 58 or an automated response system, and data transmissions are passed on to a modem or other piece of telecommunication/computer equipment 60 for demodulation and further signal processing.

Also in various embodiments, the information providers 85 and other vehicles 90 may provide information to the vehicle 12 regarding geographic areas in which the vehicle 12 may travel, including information as to cellular signal strength in such geographic areas.

The modem or other telecommunication/computer equipment 60 may include an encoder, as previously explained, and can be connected to various devices such as a server 54 and database 56. For example, database 56 could be designed to store subscriber profile records, subscriber behavioral patterns, or any other pertinent subscriber information. Although the illustrated example has been described as it would be used in conjunction with a remote server 18 that is manned, it will be appreciated that the remote server 18 can be any central or remote facility, manned or unmanned, mobile, or fixed.

Figure 2:
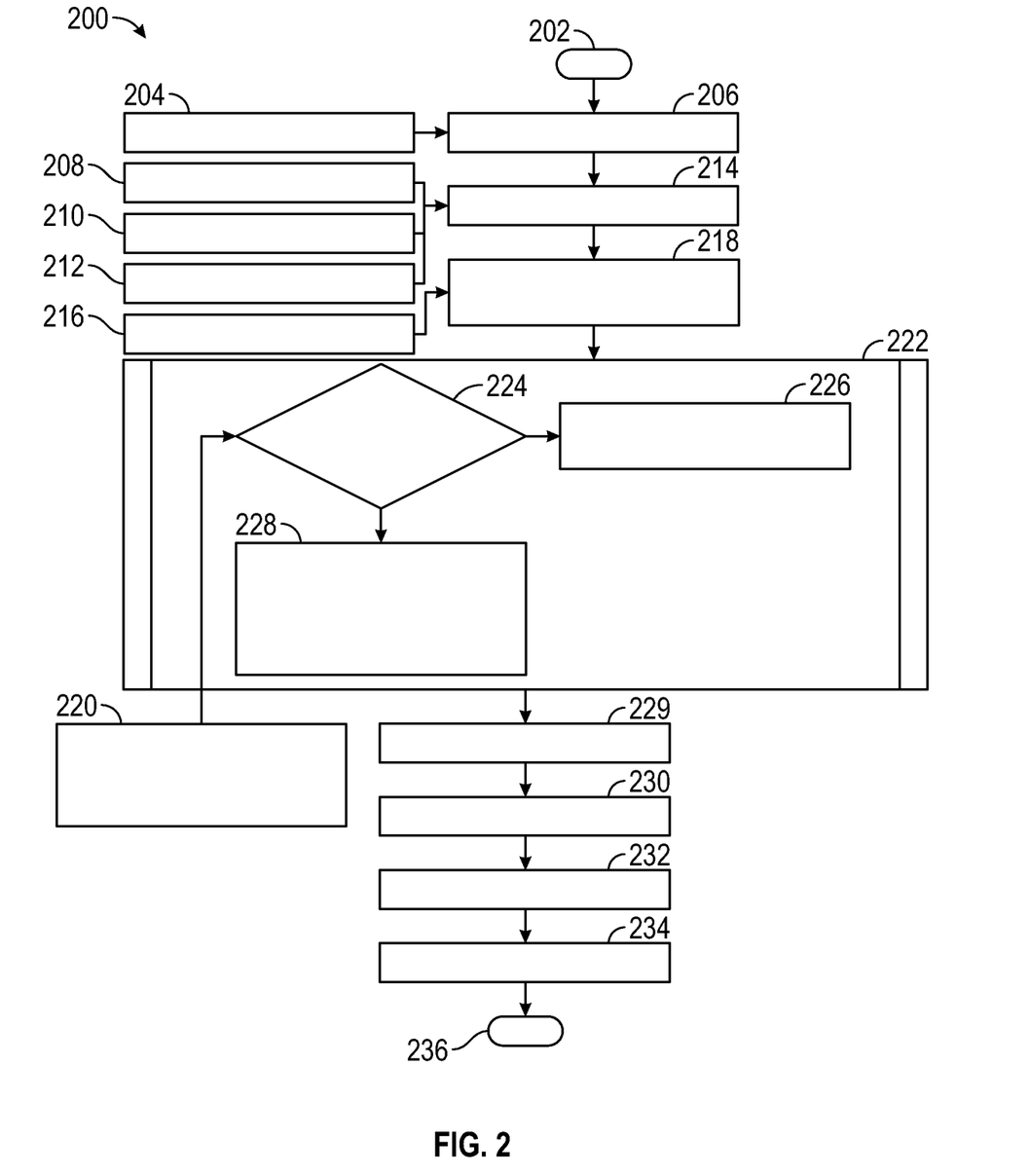
FIG. 2 is a flowchart of a process for downloading map information for upcoming geographic areas, including areas with little or no cellular reception, and that can be implemented in connection with the communications system of FIG. 1, including the vehicle and control system thereof, in accordance with an exemplary embodiment.

FIG. 2 is a flowchart of a process 200 for downloading map information for upcoming geographic areas, including areas with little or no cellular reception, in accordance with an exemplary embodiment. In various embodiments, the process 200 can be implemented in connection with the communications system 10 of FIG. 1, including the vehicle 12 and control system 11 thereof, in accordance with an exemplary embodiment.

As depicted in FIG. 2, in an exemplary embodiment, the process 200 begins at step 202. In various embodiments, the process 200 begins when a driver enters the vehicle 12 and/or begins operation of the vehicle 12, and/or when a current vehicle drive and/or ignition cycle begins.

In various embodiments, driver inputs are received at step 204. In various embodiments, the driver inputs are obtained via one or more vehicle sensors 72 based on inputs provided by the driver (e.g., the driver 13 of FIG. 1) either directly to the vehicle 12 and/or via the electronic device 15 of the driver.

In various embodiments, a destination is set at step 206. In various embodiments, the processor 38 of the control system 11 of FIG. 1 sets the destination of travel for the vehicle 12 based on the driver inputs of step 204.

Also, in various embodiments, various additional inputs are obtained, including navigation system inputs (step 208), information service inputs (step 210), and additional driver inputs (step 212). In various embodiments, the navigation system inputs of step 208 include information from a satellite-based network (e.g., a Global Positioning System (GPS)) system, in coordination with the GPS chipset/component 42 of FIG. 1, as to geographic areas that are along possible routes to the destination. Also in various embodiments, the information service inputs of step 210 include information from one or more information providers 85 (e.g., online mapping services, or the like) of FIG. 1 regarding possible routes to the destination. Also in various embodiments, the additional driver inputs of step 212 include any additional driver input, for example as to preferences of different types of routes to reach the destination.

In various embodiments, a route is selected (step 214). In various embodiments, the processor 38 of the control system 11 of FIG. 1 selects the route for the vehicle to take to reach the destination of step 206, based on the inputs of steps 208-216. In certain embodiments, the additional driver inputs of step 212 reflect the driver's choice of possible routes displayed based on the navigation system inputs of step 208 and the information service inputs of step 210; however, this may vary in other embodiments.

Figure 5:
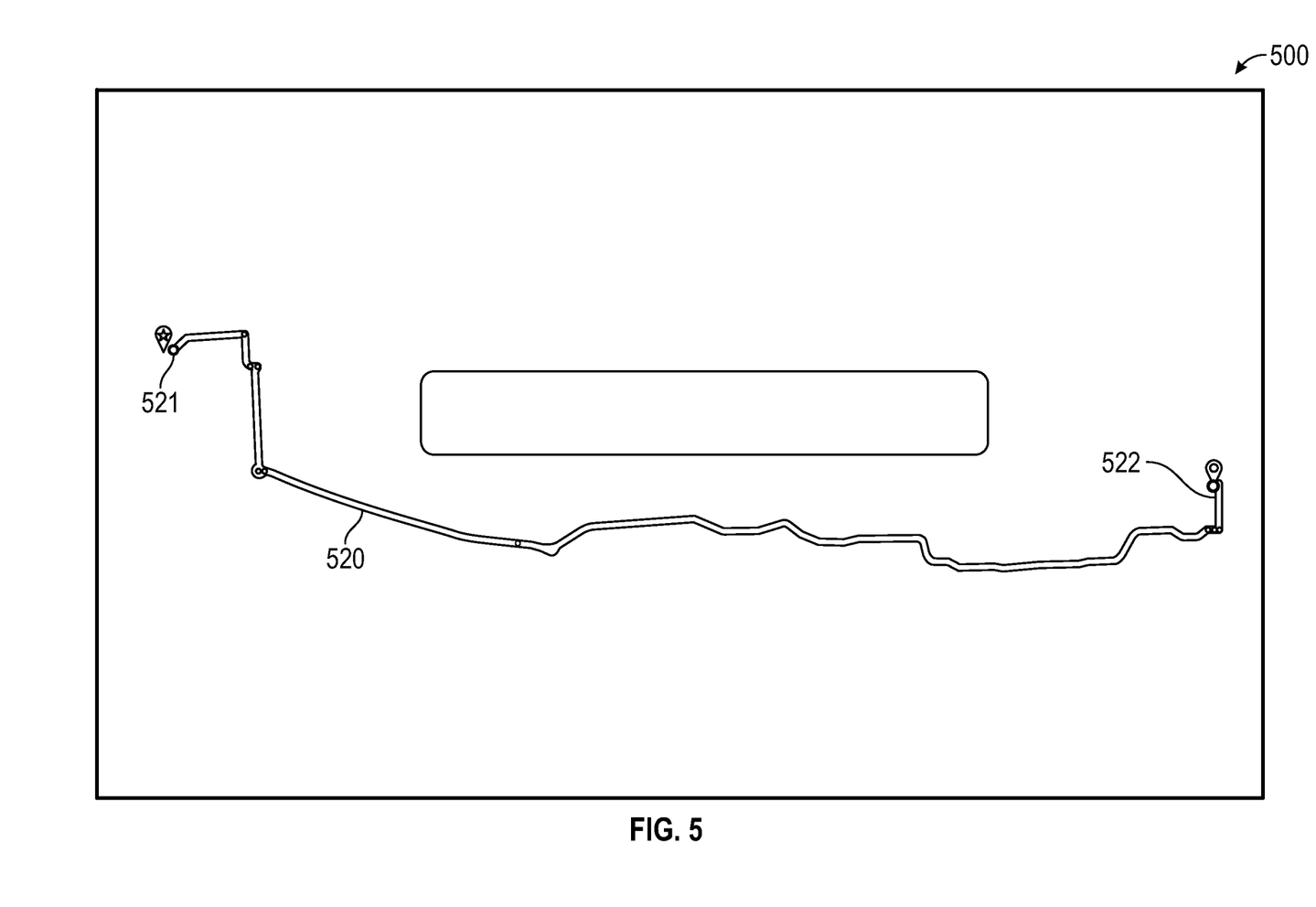
FIGS. 5-8 provide illustrations of exemplary implementations of the processes of FIGS. 2-4, in accordance with an exemplary embodiment.

With reference to FIG. 5, an exemplary illustration is provided of the selected route 520 as depicted on a simplified map. As shown in FIG. 5, the selected route 520 travels from an initial (or current) location 521 to the destination 522.

With reference back to FIG. 2, in various embodiments, map data is obtained at step 216. In various embodiments, the map data contains geographic information as to geographic areas in proximity to the route selected in step 214. In certain embodiments, the map data is stored in the memory 40 of the vehicle 12 of FIG. 1. In certain other embodiments, the map data is provided to the vehicle 12 by the remote server 18 of FIG. 1. In yet other embodiments, the map data is provided to the vehicle 12 by the information providers 85 of FIG. 1.

Also in various embodiments, a plurality of tiles [0, . . . , k] are selected to support the chosen route (step 218). In various embodiments, the processor 38 of the control system 11 of FIG. 1 selects the tiles from the map data of step 216 based on the route selected in step 214. In various embodiments, each tile represents a square or rectangular geographic are from the map data that the vehicle 12 is set to travel to via the chosen route in order to reach the destination.

Figure 6:
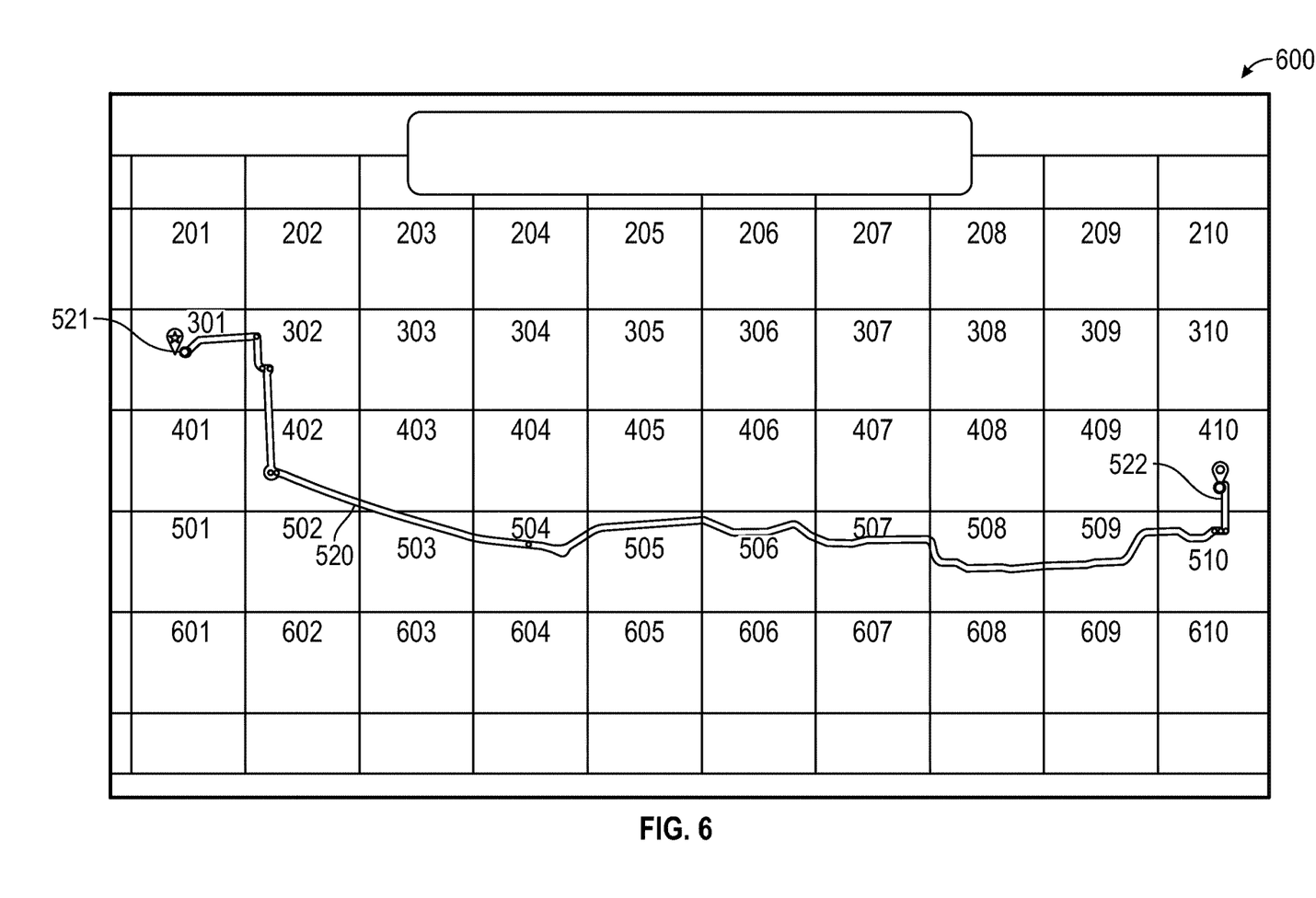

With reference to FIG. 6, an exemplary illustration is provided of the simplified map of FIG. 5 that includes the selected route 520. As depicted in FIG. 6, a number of map tiles 201-210, 301-310, 401-410, 501-510, and 601-610 are depicted in proximity to the selected route 520. Also as depicted in FIG. 6, in an exemplary embodiment the selected route 520 is set to travel through the following map tiles: 301, 302, 402, 403, 503, 504, 505, 506, 507, 508, 509, 510, and 410.

With reference back to FIG. 2, in various embodiments, a data access map is provided (step 220). In various embodiments, the data access map represents a level of data access (e.g., a level of cellular or other communications reception or availability) for each of the map tiles of FIG. 6. In certain embodiments, the data access map is stored in the memory of the vehicle 12 of FIG. 1. In certain other embodiments, the data access map is provided to the vehicle 12 by the remote server 18 of FIG. 1. In yet other embodiments, the data access map is provided to the vehicle 12 by the information providers 85 of FIG. 1. In certain embodiments, the data access map incorporates data access experiences of other vehicles (e.g., the other vehicles 90 of FIG. 1) that are travelling through or have travelled through some of the same geographic areas.

Figure 7:
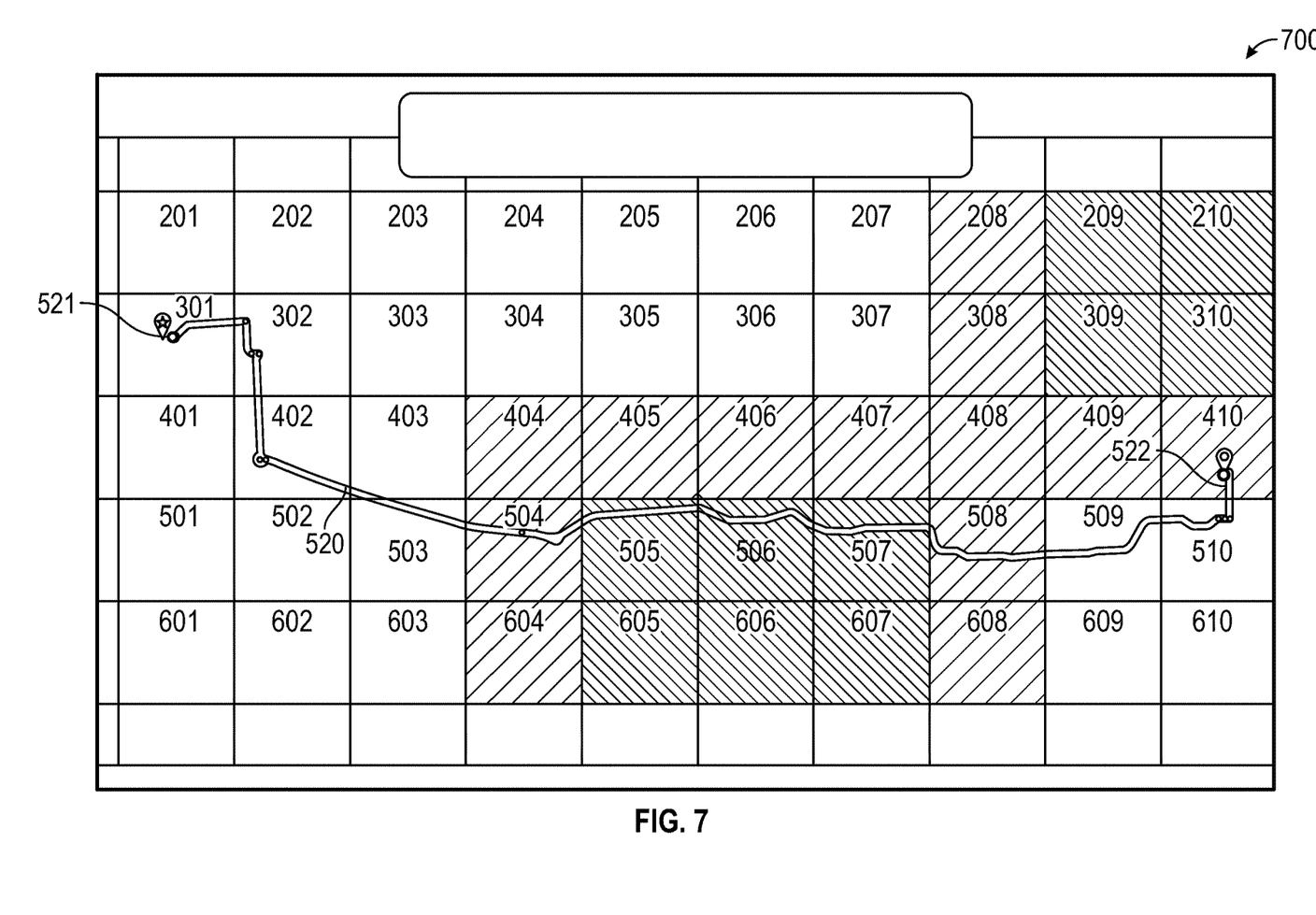

With reference to FIG. 7, an exemplary illustration is provided of the simplified map of FIGS. 5 and 6 that includes the selected route 520 and map tiles, and that further includes the data access map. As depicted in FIG. 7, the map tiles are assigned one of the following data access designations: (i) good data access (e.g., having cellular or other communication reception sufficient for the vehicle download needs), including map tiles 201-207, 301-307, 401-403, 501-503, 509, and 510, and 601-603, 609, and 610; (ii) limited data access (e.g., having limited cellular or other communication reception such that vehicle downloads may be difficult or slower than desired), including map tiles 208, 308, 404-410, 504, 508, 604, and 608; and (iii) no data access (e.g., having no cellular or other communication reception available to support vehicle downloads), including map tiles 209, 210, 309, 310, 505-507, and 605-607.

With reference back to FIG. 2, in various embodiments, the data access map is utilized to schedule the required map tiles for downloading by the vehicle (step 222). In various embodiments, as depicted in FIG. 2, step 222 refers to a combined step (described below as individual steps 224-228, which are performed for each selected map tile in various embodiments) in which the map tiles represented the selected route are scheduled for downloading in an itemized order based on the data access map. Also in various embodiments, the downloaded map tiles are for use by the vehicle in performing automatic control over one or more vehicle functions, such as control of powertrain, steering, and/or braking.

In various embodiments, during step 224, for each particular map tile on the selected route, a determination is made as to whether the map tile overlaps with the list of map tiles having limited or no data access. In various embodiments, this determination is made by the processor 38 of FIG. 1 based on the data access map.

In various embodiments, if it is determined that the particular map tile does not have limited or no data access (i.e., that the particular tile has good data access in accordance with the data access map), then the process proceeds to step 226. During step 226, the particular map tile is queued for regular or standard downloading (e.g., when the vehicle enters or is about to enter the geographic area represented by the map tile), without any special priority. Conversely, if it is instead determined that the particular map tile does have limited or no data access (in accordance with the data access map), then the process proceeds instead to step 228. During step 228, the particular map tile is queued into a prioritized sequence for prioritized downloading before the vehicle approaches the geographic area represented by the map tile (i.e., before the vehicle leaves vehicle is expected to lose its data access when approaching the particular map tile). In various embodiments, as part of steps 222-228, a processor (such as the processor 38 of FIG. 1) determines groups of consecutive map tiles with corresponding geographic areas with reduced or no cellular reception, and determines the prioritized sequence for downloading the plurality of map tiles, based on the groups of consecutive map tiles with corresponding geographic areas with reduced or no cellular reception, such that a particular map tile is downloaded prior to any groups of consecutive map tiles with corresponding geographic areas with reduced or no cellular reception that immediately precede the particular map tile.

In various embodiments, steps 224-228 are performed for each map tile on the selected route for the vehicle to reach its destination.

Figure 8:
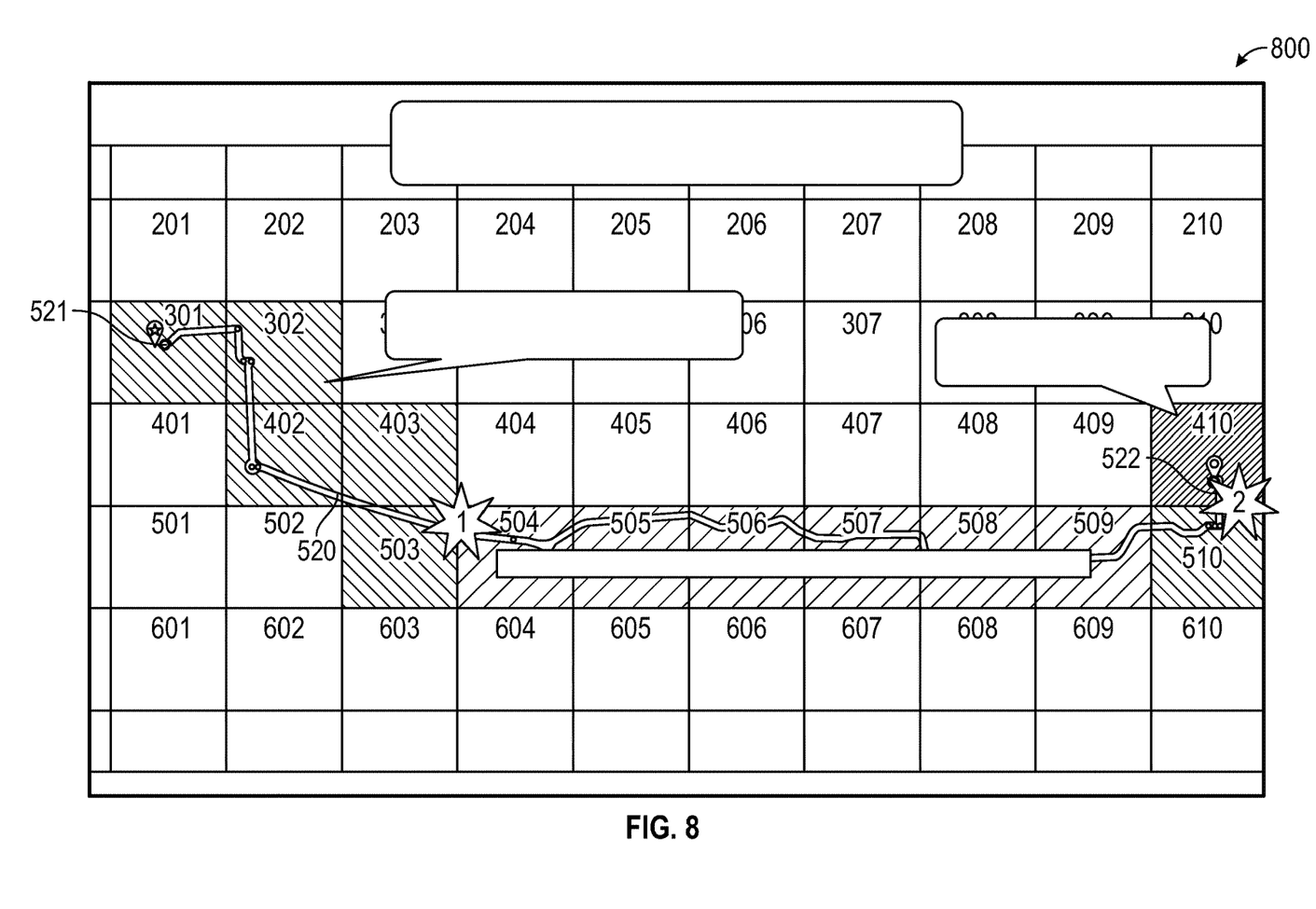

With reference to FIG. 8, the queuing of the map tile is illustrated in connection with an exemplary embodiment that builds upon the simplified map depictions of FIGS. 5-7. Specifically, as illustrated in FIG. 8 in an exemplar embodiment, map tiles 301, 302, 402, 403, and 404 are downloaded by the vehicle in standard or typical sequence as the vehicle approaches or enters these particular geographic areas, due to the data access available for these map tiles. Also as depicted in FIG. 8, in an exemplary embodiment map tiles 504, 505, 506, 507, 508, and 509 are downloaded early due to specifical prioritization. Specifically, in an exemplary embodiment, map tiles 504, 505, 506, 507, 508, and 509 are downloaded before the vehicle enters the geographic area represented by tile 504, due to the fact that data access for each of tiles 504, 505, 506, 507, and 508 is limited or unavailable. Next, in an exemplary embodiment, map tile 510 is downloaded in standard or typical sequence as the vehicle approaches or enters the geographic area represented by map tile 510, due to the data access available for map tile 510. Finally, in an exemplary embodiment, map tile 410 is downloaded before the vehicle enters the geographic area represented by map tile 410, due to the fact that data access for tile 410 is limited or unavailable. Accordingly, in an exemplary embodiment, map tile 410 is downloaded while the vehicle is still located in one of the geographic areas represented by map tiles 509, 510.

With reference back to FIG. 2, in various embodiments, the map tiles are downloaded (step 229). In various embodiments, the map tiles are downloaded in the sequence determined in steps 224-228, as described above. In various embodiments, the map tiles are downloaded and stored into the memory 40 of the vehicle 12 (step 230), and are then implemented during vehicle operation (step 232). In various embodiments, the geographic information from the map tiles are implemented in provided automated control of one or more vehicle functions, such as automatic powertrain control, automatic steering control, and automatic braking control. For example, in certain embodiment, the processor 38 of FIG. 1 utilizes information as to the location, curvature, slope, and the like of the roadways along with other geographic information in implementing the automatic control of these functions for the vehicle.

Also in various embodiments, the map databases are updated (step 232). Specifically, in various embodiments, the map databases of FIGS. 5-8 are updated based on the information obtained and/or experienced by the vehicle 12 throughout the process 200. In various embodiments, this includes updating of the data access map and associated data of FIG. 7, such that the data access map can be updated accordingly for subsequent use by the vehicle 12 and/or other vehicles 90 of FIG. 1.

In various embodiments, the process then terminates (step 236).

Figure 3:
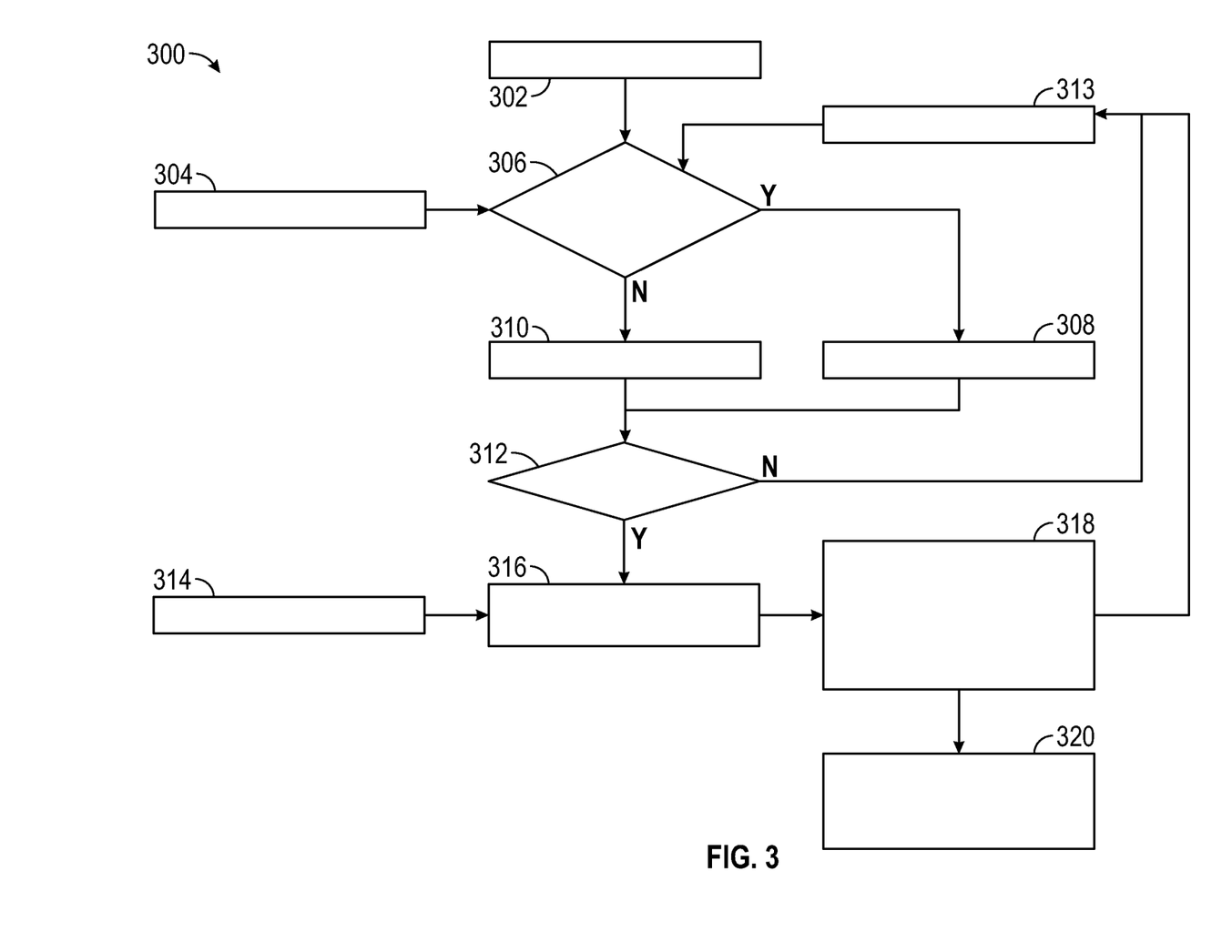
FIG. 3 is a flowchart of a process that is used in connection with the process of FIG. 2, namely, determining a low cell signal area, in accordance with an exemplary embodiment.

With reference to FIG. 3, a flowchart is provided for a process 300 of determining a low cell signal area, in accordance with an exemplary embodiment. In various embodiments, the process 300 can be utilized in building the data for the data access map of FIG. 7, and that is utilized in the process 200 of FIG. 2, in accordance with an exemplary embodiment.

In an exemplary embodiment, the process 300 begins at step 302. During step 302, a transmission drop marker (t_Drop) is set equal to zero in an exemplary embodiment.

In various embodiments, a telemetry signal is received (step 304). In various embodiments, the telemetry signal is received by the cellular chipset/component 34 of a vehicle (such as the vehicle 12 and/or one or more other vehicles 90 of FIG. 1) while disposed and/or travelling within a particular geographic area. In various embodiments, this step (along with subsequent steps of the process 300) is repeated for various geographic locations within the map.

Also in various embodiments, a determination is made as to whether signal continuity for the telemetry signals is greater than or equal to a predetermined threshold (step 306). In an exemplary embodiment the predetermined threshold is equal to approximately two seconds (2 sec); however, this may vary in other embodiments. Also in various embodiments, this determination is made by a processor (such as the processor 38 of FIG. 1).

In various embodiments, if it is determined that the signal continuity is greater than or equal to the predetermined threshold, then the process proceeds to step 308. During step 308, the drop marker (t_Drop) is decreased. In certain embodiments, the drop marker (t_Drop) is decreased by one. In various embodiments, this is performed by a processor (such as the processor 38 of FIG. 1). Also in various embodiments, the process 300 then proceeds to step 312, described further below.

Conversely, in various embodiments, if it is instead determined that the signal continuity is less than the predetermined threshold, then the process proceeds instead to step 310. During step 310, the drop marker (t_Drop) is increased. In certain embodiments, the drop marker (t_Drop) is increased by one. In various embodiments, this is performed by a processor (such as the processor 38 of FIG. 1). Also in various embodiments, the process 300 then proceeds to step 312, described directly below.

During step 312, a determination is made as to whether the drop marker (t_Drop) is greater than or equal to a predetermined threshold. In an exemplary embodiment the predetermined threshold is equal to three (3); however, this may vary in other embodiments. Also in various embodiments, this determination is made by a processor (such as the processor 38 of FIG. 1).

In various embodiments, if it is determined that the drop marker (t_Drop) is less than the predetermined threshold of step 312, then the process proceeds to step 313. During step 313, the process 300 waits a predetermined amount of time before further iterations of steps 304 and 306. In one example the predetermined amount of time of step 313 may be equal to approximately one second (1 sec); however, this may vary in other embodiments. In various embodiments, after the waiting for the predetermined amount of time of step 313, the process 300 then resumes with updated iterations of steps 304, 306 using new, updated cell signals. In various embodiments, steps 304-312 repeat using the updated cell signals until it is determined in an iteration of step 312 that the drop marker (t_Drop) is greater than or equal to the predetermined threshold of step 312.

In various embodiments, once it is determined in an iteration of step 312 that the drop marker (t_Drop) is greater than or equal to the predetermined threshold of step 312, the process 300 then proceeds to steps 314 and 316. Specifically, during step 314, in an exemplary embodiment, a current map tile is provided or identified for the geographic area in which the vehicle is now located. Also, during step 316, in an exemplary embodiment, the current map tile is designated as having limited data access. In various embodiments, this is performed by a processor, such as the processor 38 of FIG. 1.

Also in various embodiments, smart learning is performed for the geographic area (step 318). Specifically, in various embodiments, the data access map is updated to reflect information obtained during the process 300. Specifically, in certain embodiments, this includes updating the data access map of FIG. 7 to reflect which geographic regions are currently determined to have low or unavailable data access during iteration of steps 304-316. Also in various embodiments, the updated data access map is provided to the vehicle 12 as well as other vehicles 90 of FIG. 1.

Figure 4:
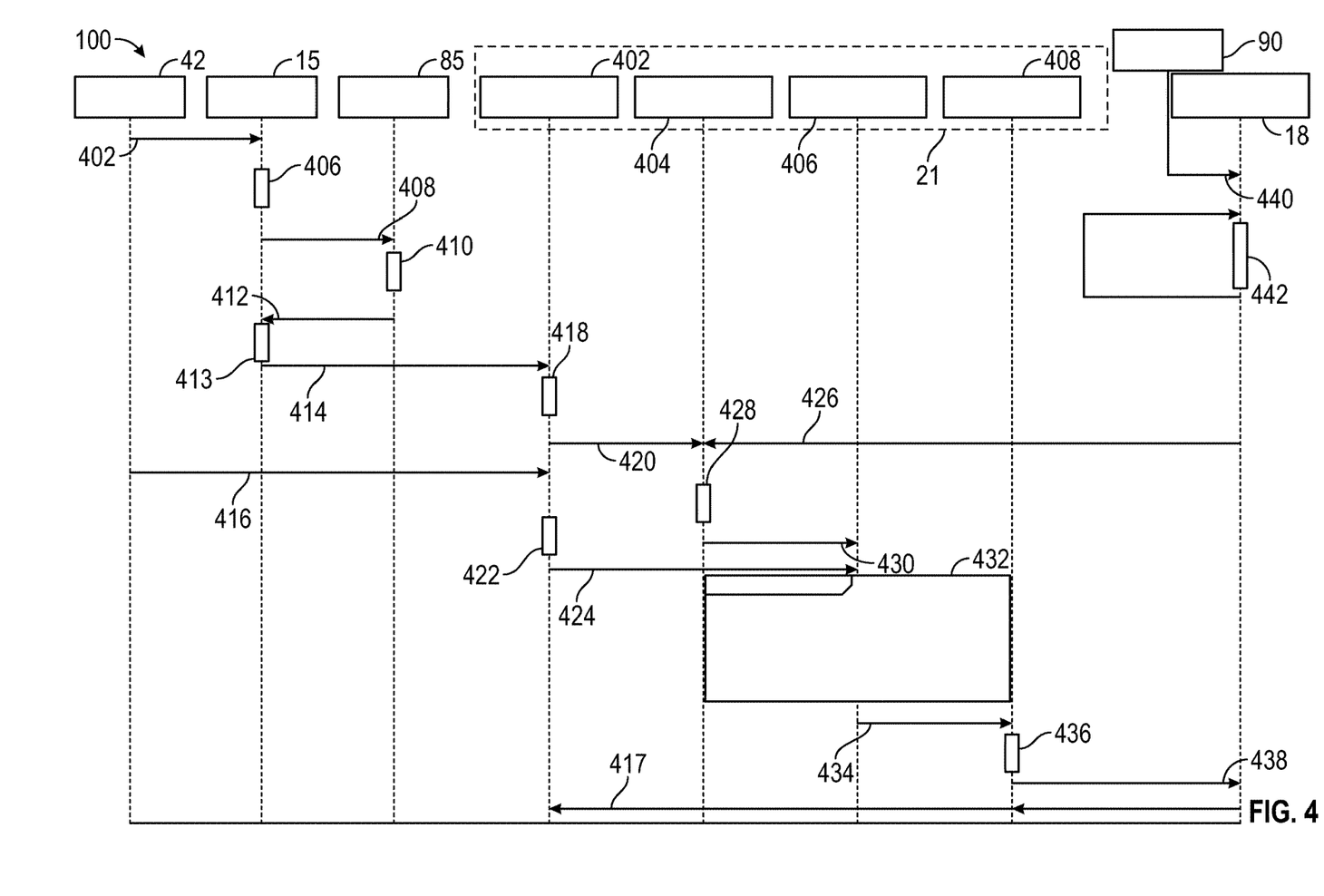
FIG. 4 is a flow diagram that is implemented in connection with the process of FIG. 2, in accordance with an exemplary embodiment.

FIG. 4 is a flow diagram 400 that is also implemented in connection with the process 200 of FIG. 2, in accordance with an exemplary embodiment. As described below, in various embodiments, the flow diagrams 400 corresponds to the process 200 of FIG. 2, but is depicted in a slightly different manner.

As depicted in FIG. 4, in an exemplary embodiment, geographic data is obtained at 402 from the navigation (e.g., GPS) system 42 of FIG. 1. In various embodiments, the geographic data 402 includes the current location of the vehicle 12. Also in various embodiments, this corresponds to step 208 of FIG. 2.

Also in various embodiments, a destination is selected at 406. In various embodiments, the destination is selected by the driver 13 of FIG. 1 via driver inputs in response to the geographic data. In various embodiments, this corresponds to steps 204, 206 of FIG. 2.

Also in various embodiments, the origin and destination are provided at 408, and route optimization is performed using the origin and destination along with information provided by one or more information providers (e.g., map providers) 85 of FIG. 1. Also in various embodiments, route options are provided at 412 using the above information, a route is selected at 413 by the driver, and the chosen route is provided at 414, along with the current location at 416. In various embodiments, these correspond to steps 208-214 of FIG. 2.

Also in various embodiments, map information is provided from a database of geographic map tiles 402 from the mapping system 21 of FIG. 1, including a tile map 417, and a search is performed at 418 of required map tiles to support the selected route. In addition, sequential tile identifications are provided at 420 to support the route, current map tile identifications are provided at 422, and the current map tile identifications are provided at 424. In various embodiments, these correspond to steps 216-218 of FIG. 2.

Also in various embodiments, a data access map 404 (with cellular strength information for each geographic area) of the mapping system 21 of FIG. 1 is provided at 426, searching is performed at 428 as to communication signal strength for each map tile, and sequential tile identifications are provided at 430 with signal strength information for each map tile on the selected route. In various embodiments, these correspond to step 220 of FIG. 2. Also in various embodiments, a tile download optimizer 406 of the mapping system 21 of FIG. 1 is utilized in conjunction with the above data and information in order to prioritize the downloading of map tiles at 432, and specifically to select an order for the downloading of the different map tiles based on their respective priorities (e.g., based on cell availability prior to and in proximity to the different map tiles). Specifically, in various embodiment, the order for the downloading is based, for each map tile, on (i) groups or "chunks" of consecutive low or no data access tiles in proximity to or prior to the map tile; (ii) a distance to each of these "chunks"; and (ii) an estimated time to each "chunk". In various embodiments, based on this information, the order is established of the tile identifications to be downloaded. In various embodiments, the identifications of the tiles to be downloaded, in the prioritized sequence, is provided at 434. In various embodiments, these correspond to steps 222-228 of FIG. 2. In various embodiments, as part of 434 (and as part of steps 222-228 of FIG. 2), a processor (such as the processor 38 of FIG. 1) determines groups of consecutive map tiles with corresponding geographic areas with reduced or no cellular reception, and determines the prioritized sequence for downloading the plurality of map tiles, based on the groups of consecutive map tiles with corresponding geographic areas with reduced or no cellular reception, such that a particular map tile is downloaded prior to any groups of consecutive map tiles with corresponding geographic areas with reduced or no cellular reception that immediately precede the particular map tile.

Also in various embodiments, a tile download system 408 of the mapping system 21 of FIG. 1 is utilized to request the specific map tiles at 436, at the appropriate times in accordance with the determined sequence. In various embodiments, the requested tiles are downloaded at 438 for use by the vehicle. In various embodiments, the downloaded tiles are utilized in automatically controlling one or more vehicle functions, such as automatic power train control, automatic braking, and/or automatic steering. In various embodiments, these correspond to steps 229-232 of FIG. 2.

Also in various embodiments, the a current cell signal strength value is obtained at step 410. In various embodiments, this is performed by the vehicle 12 as well as one or more other vehicles 90 of FIG. 1. In various embodiments, the data access map is updated using the latest information at 442, and the updated data access map is provided to the remote server 18 and to the other vehicles 90. In various embodiments, these correspond to step 234 of FIG. 2.

Accordingly, in various embodiments, methods and systems are provided for downloading map tiles for use in automatically controlling vehicle systems. In various embodiments, data access (e.g., including cellular reception) is determined for geographic areas in which the selected route is to travel, and the downloading of the map tiles is prioritized based on the data access.

It will be appreciated that the systems and methods may vary from those depicted in the Figures and described herein. For example, the communications system of FIG. 1, including the vehicle thereof and components thereof, may vary from that depicted in FIG. 1 and/or described herein, in various embodiments. It will similarly be appreciated that the processes of FIGS. 2-4 may differ from those described herein and/or depicted in FIG. 3, and/or that steps thereof may be performed simultaneously and/or in a different order as described herein and/or depicted in FIGS. 2-4, among other possible variations. It will similarly be appreciated that the implementations of FIGS. 5-8 may also vary in different embodiments.

While at least one example has been presented in the foregoing detailed description, it should be appreciated that a vast number of variations exist. It should also be appreciated that the example or examples are only examples, and are not intended to limit the scope, applicability, or configuration of the disclosure in any way. Rather, the foregoing detailed description will provide those skilled in the art with a convenient road map for implementing the example or examples. It should be understood that various changes can be made in the function and arrangement of elements without departing from the scope of the appended claims and the legal equivalents thereof.

What is claimed is:

1. A method comprising:
   identifying, via a processor using map data, a plurality of geographic areas in which a vehicle is to travel along a selected route to a destination;
   identifying, via the processor using the map data, a plurality of map tiles corresponding to the plurality of geographic areas, such that each of the plurality of map tiles corresponds to a different one of the plurality of geographic areas;
   obtaining data access information for each of the plurality of geographic areas, including cellular reception information for each of the plurality of geographic areas;
   determining, via the processor, groups of consecutive map tiles with corresponding geographic areas with reduced or no cellular reception; and
   determining, via the processor, a prioritized sequence for downloading the plurality of map tiles, based on the data access information for the plurality of geographic areas, including based on the cellular reception information for the plurality of geographic areas, and including based on the groups of consecutive map tiles with corresponding geographic areas with reduced or no cellular reception.

2. The method of claim 1, further comprising:
   downloading, to the vehicle, via instructions provided by the processor, the plurality of map tiles in accordance with the prioritized sequence.

3. The method of claim 2, further comprising:
   controlling a vehicle action, in accordance with further instructions provided by the processor, using geographic information from the plurality of map tiles.

4. The method of claim 2, wherein the controlling of the vehicle action is based on the groups of consecutive map tiles with corresponding geographic areas with reduced or no cellular reception.

5. The method of claim 4, wherein the controlling of the vehicle action comprises selecting a route of travel for the vehicle and controlling one or more vehicle functions including one or more of automatic powertrain control, automatic steering control, and automatic braking control based on based on the groups of consecutive map tiles with corresponding geographic areas with reduced or no cellular reception.

6. The method of claim 1, wherein the step of determining the prioritized sequence further comprises determining the prioritized sequence such that a particular map tile is downloaded prior to any groups of consecutive map tiles with corresponding geographic areas with reduced or no cellular reception that immediately precede the particular map tile.

7. The method of claim 1, further comprising:
determining that specific geographic areas have reduced or no cellular reception based on signal continuity data obtained from one or more other vehicles.

8. The method of claim 7, further comprising:
determining additional signal continuity data from the vehicle; and
updating the cellular reception information, using the additional signal continuity data from the vehicle, for use by the one or more other vehicles.

9. A system comprising:
a computer memory configured to store map data; and
a processor coupled to the computer memory and configured to at least facilitate:
identifying, using the map data, a plurality of geographic areas in which a vehicle is to travel along a selected route to a destination;
identifying, using the map data, a plurality of map tiles corresponding to the plurality of geographic areas, such that each of the plurality of map tiles corresponds to a different one of the plurality of geographic areas;
obtaining data access information for each of the plurality of geographic areas, including cellular reception information for each of the plurality of geographic areas;
determining, via the processor, groups of consecutive map tiles with corresponding geographic areas with reduced or no cellular reception; and
determining a prioritized sequence for downloading the plurality of map tiles, based on the data access information for the plurality of geographic areas, including based on the cellular reception information for the plurality of geographic areas, and including based on the groups of consecutive map tiles with corresponding geographic areas with reduced or no cellular reception.

10. The system of claim 9, wherein the processor is further configured to at least facilitate:
downloading, to the vehicle, via instructions provided by the processor, the plurality of map tiles in accordance with the prioritized sequence.

11. The system of claim 10, wherein the processor is further configured to at least facilitate:
controlling a vehicle action, in accordance with further instructions provided by the processor, using geographic information from the plurality of map tiles.

12. The system of claim 11, wherein the processor is configured to control the vehicle action based on the groups of consecutive map tiles with corresponding geographic areas with reduced or no cellular reception.

13. The system of claim 12, wherein the processor is configured to select a route of travel for the vehicle and control one or more vehicle functions including one or more of automatic powertrain control, automatic steering control, and automatic braking control based on based on the groups of consecutive map tiles with corresponding geographic areas with reduced or no cellular reception.

14. The system of claim 9, wherein the processor is further configured to at least facilitate:
determining the prioritized sequence such that a particular map tile is downloaded prior to any groups of consecutive map tiles with corresponding geographic areas with reduced or no cellular reception that immediately precede the particular map tile.

15. The system of claim 9, wherein the processor is further configured to at least facilitate:
determining that specific geographic areas have reduced or no cellular reception based on signal continuity data obtained from one or more other vehicles.

16. The system of claim 15, wherein the processor is further configured to at least facilitate:
determining additional signal continuity data from the vehicle; and
updating the cellular reception information, using the additional signal continuity data from the vehicle, for use by the one or more other vehicles.

17. A vehicle comprising:
a body;
a computer memory configured to store map data; and
a processor coupled to the computer memory and configured to at least facilitate:
identifying, using the map data, a plurality of geographic areas in which the vehicle is to travel along a selected route to a destination;
identifying, using the map data, a plurality of map tiles corresponding to the plurality of geographic areas, such that each of the plurality of map tiles corresponds to a different one of the plurality of geographic areas;
obtaining data access information for each of the plurality of geographic areas, including cellular reception information for each of the plurality of geographic areas;
determining, via the processor, groups of consecutive map tiles with corresponding geographic areas with reduced or no cellular reception; and
determining a prioritized sequence for downloading the plurality of map tiles, based on the data access information for the plurality of geographic areas, including based on the cellular reception information for the plurality of geographic areas, and including based on the groups of consecutive map tiles with corresponding geographic areas with reduced or no cellular reception.

18. The vehicle of claim 17, wherein the processor is further configured to at least facilitate:
downloading, to the vehicle, via instructions provided by the processor, the plurality of map tiles in accordance with the prioritized sequence; and
controlling a vehicle action, in accordance with further instructions provided by the processor, using geographic information from the plurality of map tiles.

19. The vehicle of claim 18, wherein the processor is configured to control the vehicle action based on the groups of consecutive map tiles with corresponding geographic areas with reduced or no cellular reception.

20. The vehicle of claim 19, wherein the processor is configured to select a route of travel for the vehicle and control one or more vehicle functions including one or more of automatic powertrain control, automatic steering control, and automatic braking control based on based on the groups of consecutive map tiles with corresponding geographic areas with reduced or no cellular reception.

* * * * *